United States Patent Office 3,345,393
Patented Oct. 3, 1967

3,345,393
ORGANOMERCAPTOMETHYL-SILICON
COMPOUNDS AND PRODUCTION
Walter Simmler, Cologne-Mulheim, and Hans Niederprüm, Monheim, Germany, assignors to Farbenfabriken Bayer Aktiengesellschaft, Leverkusen, Germany, a German corporation
No Drawing. Filed June 11, 1963, Ser. No. 286,909
Claims priority, application Germany, June 30, 1962, F 37,208
5 Claims. (Cl. 260—448.2)

The invention relates to silicon-organic thioether derivatives containing the group.

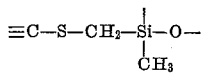

as essential structural unit; moreover, the invention relates to a process of producing these derivatives.

Compounds of this type are substantially alkyl- and arylmercaptomethyl-siloxanes, the other siloxane units of which may be selected in known manner from mono-, di- and tri-functional alkyl-siloxane and aryl-siloxane units. These siloxanes have the composition $R_nSiO_{4-n/2}$, with a numerical value of $n$ between 1 and 3, and with the proviso that at least one of the substituents R is an organomercaptomethyl radical and all other radicals R are alkyl or aryl radicals which may also be substituted indifferently.

Derived from polyfunctional mercaptans carrying two functional groups in adjacent positions, six-membered heterocycles representing, for example, 2-sila- and 2,6-disila-1,4-oxathiane derivatives, also belong to the thioethers to be produced according to the invention.

The invention is based on the discovery that bromomethyl-silicon compounds react directly and sometimes even at room temperature with mercaptans and, in the presence of tertiary amines, yield the thioether derivatives in a smooth reaction, splitting off hydrogen bromide.

This discovery is the more surprising, as, in spite of the greater electron affinity of chlorine in comparison with bromine, the analogous chloromethyl silicon compounds require the use of metal mercaptides for the same purpose, and yet lower yields of sila-alkyl thioethers result even then.

The use of a mercaptide involves not only the substantial additional exppenditure for its preparation, but also the disadvantage that the mercaptide, being insoluble, must be reacted in a heterogeneous phase, and that it is hygroscopic as well as sensitive to hydrolysis so that water and alkali metal hydroxide penetrate into the reaction mixture leading to substantial side reactions of the silicon compounds.

According to the invention therefore organomercaptomethyl-silicon compounds are produced by reacting (1) a bromomethyl silicon compound which may be (a) an organopolysiloxane of the general formula $R_nSiO_{4-n/2}$ with a numerical value of $n$ between 1 and 3 and wherein at least one of the siloxane units has the formula

$m$ being equal to 1 or 2, and every other R denotes an optionally indifferently substituated alkyl or aryl radical, or (b) a bromomethyl-silane of the general formula

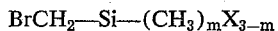

$m$ being equal to 1 or 2, wherein X denotes a chlorine atom or a lower alkoxy radical, with (2) an optionally hydroxyl-substituted mono- or polyvalent mercaptan including thiophenols), in the presence (3) of a tertiary nitrogen base and optionally an inert solvent.

For carrying out the process, either a mercaptan is mixed with at least the amount, stoichiometrically calculated from the reaction equation, of a tertiary nitrogen base and optionally an inert solvent, gradually adding thereto, normally with heating, the bromomethyl-silicon compound which may likewise be diluted with a solvent, or, inversely, the mercaptan amine mixture is gradually added to the bromomethyl-silicon compound. Benzene and its homologues are recommended as inert solvents. They serve for keeping the crystal mass formed by precipitation of salt sufficiently stirrable. Their amount has to be chosen in accordance with this purpose.

In the case of polyvalent mercaptans, it is essentially a question of the chosen molecular proportions, whether HS groups remain free, leading, for example, to the grouping $=Si(CH_3)—CH_2—S—C_xH_y—SH$, or whether thioether bridges such as $=Si(CH_3)—CH_2—S—C_xH_y—S—CH_2—Si(CH_3)=$ are obtained.

In the reaction of polyfunctional mercaptans which contain in the adjacent position to the HSC group a functional group, e.g. —OH, capable of reacting with a silicon-functional siloxane substituent, six-membered heterocycles are formed; for example, in one of the simplest cases, according to

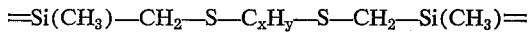
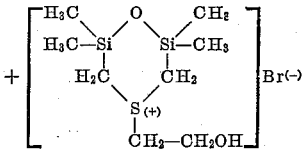

It has further been found that when using in the afore described reaction instead of the ethoxysilane derivative,

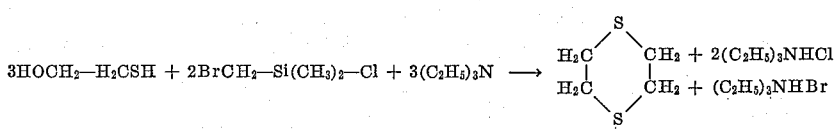
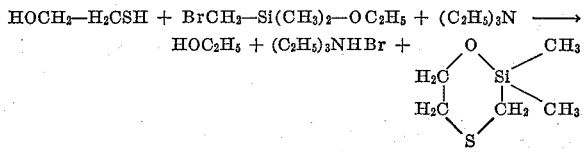

bromomethyl-dimethyl-chlorosilane, a side reaction takes place, which leads with siloxane condensation to the formation of 1,4-dithiane and water, in which a sulphonium salt, i.e. the bromide of 2,2,6,6-tetramethyl-2,6-disila-4-(β-hydroxyethyl)-1,4-oxathiane, is formed:

This oxathiane derivative is also obtained by carrying out the reaction according to the invention of β-hydroxyethlymercaptan directly with 1,3-di-(bromomethyl)-1,1,3,3-tetramethyl-disiloxane. Thus, also in this case ring formation occurs as well as the formation of the sulphonium cation.

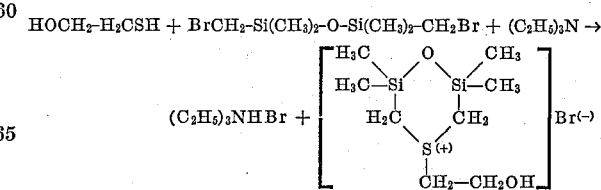

The preponderantly new alkyl- and aryl-mercaptosilicon compounds produced according to the invention are especially suitable as lubricants and for the modification of polymers.

The following examples are given for the purpose of illustrating the invention.

*Example 1*

A solution of 160 g. (0.5 mol) of 1,3-di-(bromomethyl)-1,1,3,3-tetramethyl-disiloxane in 100 cc. of toluene is added dropwise in the course of 2 hours while stirring and slowly heating to 100° C., to a mixture of 90 g. (1 mol) of n-butylmercaptan, 121 g. (1.2 mols) of triethylamine and 300 cc. of toluene, and stirring is continued at 100° C. for a further 8 hours. The precipitated salt is separated by filtration. It contains 71.1 g. of bromine, determined by titration after dissolution in water, and corresponding to 89 percent of the theoretically possible amount.

The filtrate thereof is concenarated by evaporation with evacuation by means of a water jet pump, the residue is again filtered and the filtrate distilled. As main fraction boiling between 2 and 3 mm. Hg at temperatures between 130 and 150° C., 1,3-di-(n-butylmercaptomethyl)-1,1,3,3-tetramethyl-disiloxane is obtained in the form of a yellowish oil of refractive index $n_D^{20}=1.4718$. The yield of 98 g. amounts to 58 percent of the theoretical. Contents per weight according to elementary analysis: 48.3% C., 19.0% S (calculated for $C_{14}H_{34}OS_2Si_2$: 49.6% C, 18.9% S).

*Example 2*

A solution of 160 g. of 1,3-di-(bromomethyl)-1,1,3,3-tetramethyl-disiloxane in 100 cc. of toluene is added dropwise in the course of 2 hours, while stirring, to a mixture of 110.2 g. of thiophenol, 121 g. of triethylamine and 500 cc. of toluene, whereupon the mixture slowly warms up and a white salt precipitates. Stirring is continued with heating at about 50° C. for a further 3 hours, the precipitated triethyl ammonium chloride is then separated by filtration which after washing with toluene and drying amounts to 162 g. It contains 43.4 percent by weight of ionic bromine (calculated 43.9).

The filtrate is first evaporated with evacuation by means of a water jet pump and finally evaporated to dryness 100° C. 3 mm. Hg. After removal of small amounts of further precipitated salt by renewed filtration, 183 g. of a yellowish oil of refractive index $n_D^{20}=1.5615$ are obtained, corresponding to 96.6 percent of the theoretically possible amount of 1,3-di-(phenylmercaptomethyl)-1,1,3,3-tetramethyl-disiloxane. Contents per weight according to elementary analysis: 55.5% C, 16.1% S (calculated for $C_{18}H_{26}OS_2Si_2$: 57.1% C, 16.9% S).

*Example 3*

1052 g. of a methylbromomethyl-polysiloxane having a bromine content of 11.5 percent by weight and the composition $Si(CH_3)O_{3/2}2.1Si(CH_3)_2O$.

$$3(BrCH_2)Si(CH_3)_2O_{1/2}$$

is slowly added dropwise, while stirring, to mixture of 182 g. (1.65 mols) of thiophenol, 182 g. (1.8 mols) of triethylamine and 600 cc. of toluene. The reaction mixture is then heated at 100° C. for 3 hours and filtered. The salt remaining on the filter contains 87.5 percent of the bromine used. The solvent is distilled off from the filtrate, the residue is heated at 100° C. and at 2.5 mm. Hg and filtered. A viscous yellowish oil of refractive index $n_D^{20}=1.4491$ results as filtrate, in a yield of 950 g. corresponding to 87 percent of the theoretically possible amount of $\omega,\omega',\omega''$-tris-(phenylmercaptomethyl)-polymethylsiloxane of the formula

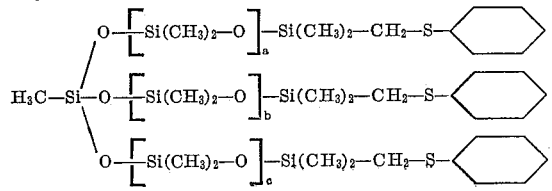

wherein the numerical values of $a$, $b$ and $c$ amount to about 7 and their sum is 21.

Contents by weight according to elementary analysis: 38.1% C, 4.0% S (calculated for $C_{70}H_{168}O_{24}S_3Si_{25}$: 38.4% C, 4.4% S).

*Example 4*

98.6 g. (0.5 mol) of dimethyl-(bromomethyl)-ethoxysilane are added dropwise at 50° C. in the course of 3 hours, while stirring, to a solution of 39.1 g. (0.5 mol) of β-hydroxyethylmercaptan and 50.6 g. (0.5 mol) of triethylamine in 400 cc. of toluene, the reaction mixture is allowed to stand at room temperature for 10 hours and the precipitated triethyl ammonium bromide containing part of the ethanol formed in the reaction is then filtered off with suction; 97 percent of the theoretically possible amount of bromide can be titrated in its aqueous solution.

The residual ethanol and toluene are distilled off from the filtrate, whereupon salt again precipitates which is separated by filtration. The thinly liquid yellowish oil obtained as filtrate is fractionally distilled, and at 41° C./2.2 mm. Hg there are obtained 34 g. of a fraction having refractive index $n_D^{20}=1.4800$ and consisting of 2,2-dimethyl-2-sila-1,4-oxathiane. Contents by weight according to elementary analysis: 40.2% C, 8.1% H, 21.4% S (calculated for $C_5H_{12}OSSi$: 40.5% C, 8.15% H, 21.6% S).

*Example 5*

A mixture of 78 g. (1 mol) of β-hydroxyethylmercaptan and 101 g. (1 mol) of triethylamine is added dropwise in the course of 6 hours, while stirring, to a solution, cooled with ice, of 187 g. (1 mol) of bromomethyl-dimethyl-chlorosilane in 1 litre of benzene. The precipitated triethyl ammonium halide is then filtered off with suction, in its aqueous solution 49 percent of the halogen used can be titrated. The filtrate is evaporated and a crystal mass again precipitates. The liquid is filtered off with suction, the crystals are washed first with benzene, then with ether, and finally purified with ether in an extraction device. The sulphonium salt formed in the reaction remains behind in the form of 42 g. of white lustrous leaflets consisting of the bromide of 2,2,6,6-tetramethyl-2,6-disila-4-(β-hydroxy-ethyl)-1,4-oxathiane.

Contents by weight according to elementary analysis: 30.29% C, 6.75% H, 10.35% S, 25.05% Br (calculated for $C_8H_{21}O_2SSi_2Br$: 30.26% C, 6.67% H, 10.10% S, 25.18% Br).

*Example 6*

Equimolecular amounts of 1,3-di-(bromomethyl)-1,1,3,3-tetramethyl-disiloxane, β-hydroxyethylmercaptan and triethylamine are mixed, twice its volume of benzene is added and the mixture heated under reflux at boiling temperature for 8 hours. The same sulphonium bromide is obtained as according to Example 5, in admixture with the equimolecular amount of triethyl ammonium bromide, in almost quantitative yield.

*Example 7*

1 kg. of a methylbromomethyl-polysiloxane having a bromine content of 15.85 percent by weight and corresponding approximately to the formula

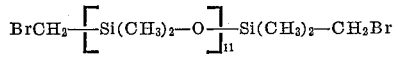

is dissolved in 1 litre of o-xylene, the solution is heated under reflux at boiling temperature for 8 hours, while adding dropwise a mixture of 154 g. of β-hydroxyethylmercaptan, 220 g. of triethylamine and 200 cc. of o-xylene. Heating with stirring is continued for a further 18 hours, the precipitated triethyl ammonium bromide is filtered off and the filtrate freed from o-xylene by evaporation and blowing out with nitrogen at 100° C. and 50 mm. Hg. As reaction product there remains a polydimethyl-siloxane with β-hydroxyethyl-mercaptomethyl groups at the chain ends, as a yellowish oil with refractive index $n_D^{20}=1.4272$ and a viscosity of 73 cst. at 20° C.

*Example 8*

A methylbromomethyl-polysiloxane is initially prepared by hydrolysing a mixture of 21.8 g. (0.2 mol) of trimethyl-chlorosilane, 320 g. (2.5 mols) of dimethyl-dichlorosilane and 104 g. (0.5 mol) of methyl-(bromomethyl)-dichlorosilane with an excess of water, taking up the hydrolysate in ether, drying this solution by means of calcium chloride, evaporating the ether, stirring the residue for equilibration with 3 percent by weight of activated bleaching earth at 150° C. for 5 hours and finally filtering.

The oil thus obtained which has approximately the composition $2Si(CH_3)_3O_{1/2} \cdot 25Si(CH_3)_2O \cdot 5(BrCH_2)Si(CH_3)O$ is then diluted with 100 cc. of toluene, and this solution is added dropwise in the course of 2 hours to a mixture consisting of 55 g. (0.5 mol) of thiophenol, 52 g. (0.5 mol) of triethylamine and 200 cc. of toluene. The reaction mixture is further stirred at 80° C. for 2 hours and then filtered and washed with toluene. 91 percent of the bromine used are found in the filter residue by titration.

The filtrate is evaporated with evacuation, heated at 100° C. and 3 mm. Hg and again filtered. 117 g. of a phenylmercaptomethyl-substituted α,ω-bis - (trimethylsiloxy)-polymethylsiloxane of the formula

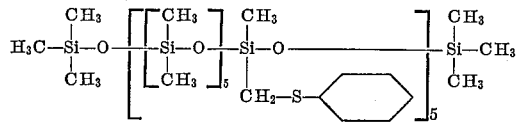

are obtained as a yellowish oil having a refractive index $n_D^{20}=1.4605$ and viscosity 65.8 cst.

We claim:

1. 1,3-di - (n - butylmercaptomethyl) - 1,1,3,3,-tetramethyldisiloxane.

2. 1,3-di-(phenylmercaptomethyl) - 1,1,3,3-tetramethyldisiloxane.

3. α,ω-Di-(β' - hydroxyethylmercaptomethyl) - dodeca-(dimethyl-siloxane).

4. Organopolysiloxane of the formula

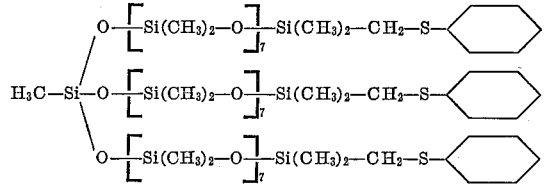

5. Organopolysiloxane of the formula

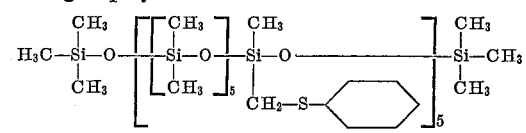

References Cited

UNITED STATES PATENTS

| | | | |
|---|---|---|---|
| 2,719,165 | 9/1955 | Cooper | 260—448.2 |
| 2,960,492 | 11/1960 | Morton et al. | 260—448.2 |
| 2,997,457 | 8/1961 | Kantor | 260—448.2 |
| 3,078,292 | 2/1963 | Prober | 260—448.2 |

OTHER REFERENCES

Cooper: "Jour. American Chem. Soc.," vol. 76, July 20, 1954, pages 3713–3716.

Derwent: Belgian Report No. 81B, abstract of Belgian Patent No. 603,832, pub. Sept. 18, 1961, page A1.

Similar: "Berichte der Deutschen Chemischen Gesellschaft," vol. 96, Jan. 21, 1963, pages 349–356.

TOBIAS E. LEVOW, *Primary Examiner.*

SAMUEL H. BLECH, HELEN M. McCARTHY,
*Examiners.*

P. F. SHAVER, *Assistant Examiner.*